Oct. 10, 1939.  E. A. WALES  2,175,418
FRICTION DISK
Filed July 28, 1934  2 Sheets-Sheet 1
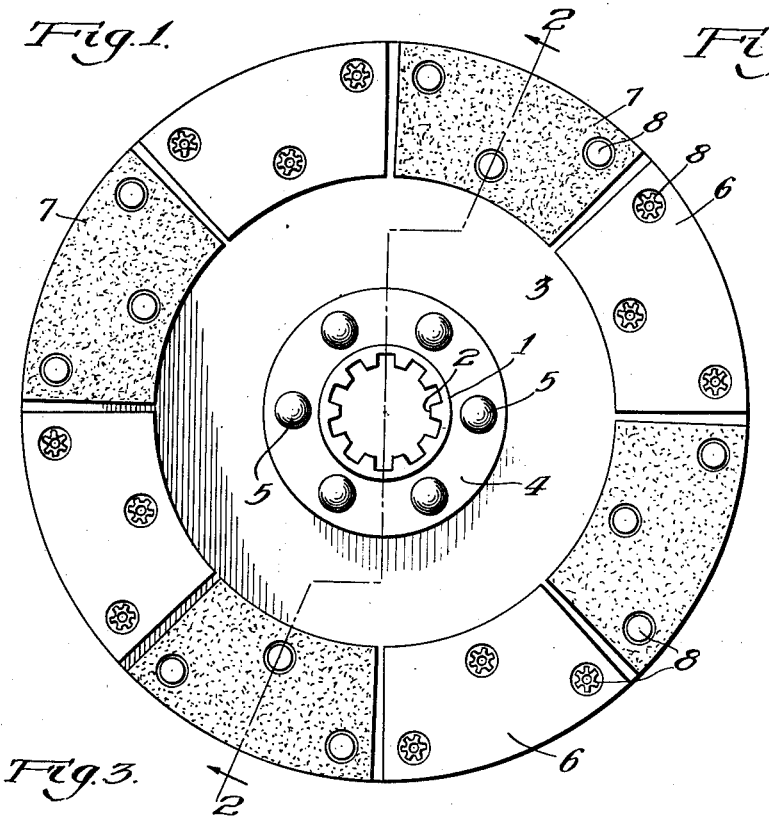
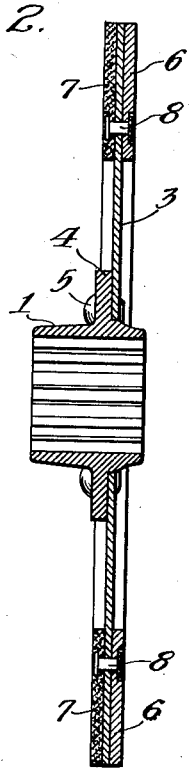
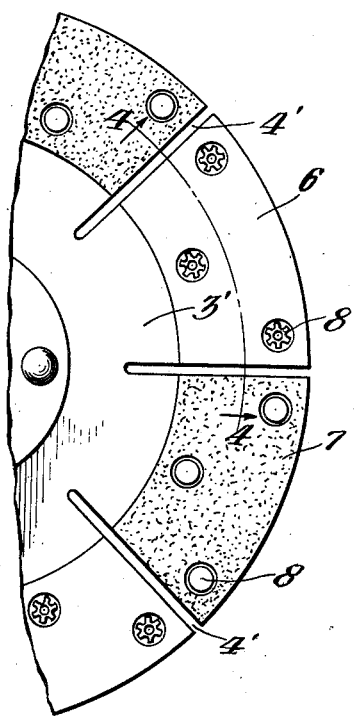
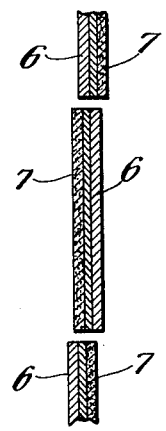
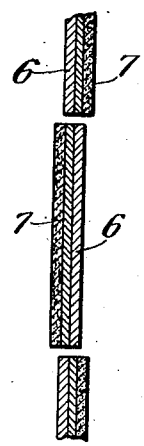
Inventor:
Earl A. Wales,
By Lee J. Gary
Attorney Oct. 10, 1939.　　　E. A. WALES　　　2,175,418
FRICTION DISK
Filed July 28, 1934　　　2 Sheets-Sheet 2

Inventor:
Earl A. Wales,
By: Lee J. Gary
Attorney.

Patented Oct. 10, 1939

2,175,418

UNITED STATES PATENT OFFICE 2,175,418

FRICTION DISK

Earl A. Wales, Cleveland, Ohio, assignor to Raybestos-Manhattan, Inc., Bridgeport, Conn., a corporation of New Jersey Application July 28, 1934, Serial No. 737,369

16 Claims. (Cl. 192—107)

This invention relates to improvements in friction disks used for disk clutches, disk brakes or the like, and refers specifically to a friction disk which is most durable, light with respect to its spinning weight and the overall coefficient of friction of which may be readily changed.

The utility, objects and advantages of my invention will be apparent from the accompanying drawing and following detail description.

In the drawing, Fig. 1 is face view, showing one form of friction disk embodying the concept of my invention.

Fig. 2 is a sectional view taken on line 2—2 of Fig. 1.

Fig. 3 is a fragmentary face view, illustrating a slight modification of my invention.

Fig. 4 is a sectional view taken on line 4—4 of Fig. 3.

Fig. 5 is a similar sectional view of another modification.

Figure 6:
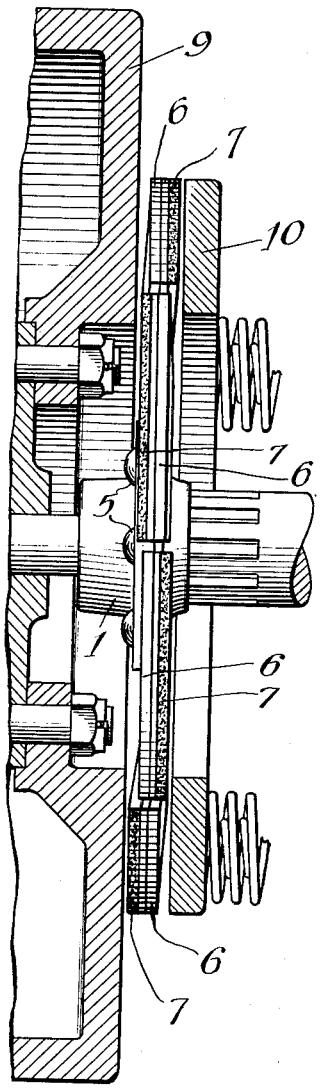
Fig. 6 is a sectional view parts being shown in elevation illustrating a clutch disk similar to that shown in Fig. 5 as used with a conventional clutch mechanism.

My invention will be described in conjunction with its use with automobile clutch disks, but it is to be understood that it is equally applicable wherever friction disks may find use.

Referring in detail to the drawing, I indicates a hub having internal splines 2 adapted for slidable but non-rotatable engagement with a correspondingly splined clutch shaft (not shown). A disk 3 constructed of metal or other sufficiently rigid, strong material may be secured to flange 4 of hub I by means of rivets 5 or the like.

As a feature of my invention, instead of utilizing an annular friction ring secured to the outer surfaces of disk 3 as is customary, I mount a plurality of sectoral friction members 6 and 7 upon each face of the disk. Members 6 and 7 may be secured to the disk 3 by means of countersunk rivets 8.

Sectors 6 may be constructed of a material having predetermined frictional characteristics and being particularly characterized by being very durable. Sectors 7 may be constructed of a material having a materially greater coefficient of friction but which is not as durable as the material constituting sectors 6. The segments 6 and 7 may be alternately spaced on one side of disk 3 and may be staggered with respect to the sectors of corresponding material on the opposite face of the disk. In other words sectors 6 will be oppositely disposed to sectors 7 throughout the circumference of the disk.

It can readily be seen that by this arrangement a friction disk may be constructed having substantially any overall coefficient of friction merely by utilizing sectors of different sizes. For instance, sectors 7 may be relatively large with respect to sectors 6, in which case a relatively high overall coefficient of friction will be obtained. If sectors 6 are larger than sectors 7 the overall coefficient of friction will be less but the durability of the friction faces of the disk as a whole will be greater.

In the use of friction disks, it has been the practice to slot the disk radially thereby providing a plurality of sectors which are then distorted to dispose portions of the sectors out of the plane of the disk proper. However, heretofore continuous annular friction rings were applied to the disk and tended to flatten the distorted sectors thereby decreasing the cushion effect sought in distorting the sectors.

Referring particularly to Figs. 3 and 4, a modification of my invention is shown which secures to the fullest extent the cushion effect inherent in the use of a slotted disk. The reference numeral 3' indicates a disk constructed of metal having a plurality of circumferentially spaced radial slots 4'. Sectoral friction elements 6 and 7 may be secured to alternate sectors of the disk defined by the slots 4' by means of rivets 8. As in the case of the form of my invention shown in Fig. 1 and Fig. 2, sectors 6 and 7 may be alternately spaced on one face of the disk and each element 6 on each face of the disk may be disposed opposite to an element 7 on the opposite face of the disk. The sectors of the disk defined by slots 4' may each be distorted in such a manner as to dispose all of the sectors in rack or ratchet fashion, as shown best in Fig. 4.

In utilizing a friction disk of this type, that portion of the disk carrying the friction elements 6 and 7 is usually compressed between two plane surfaces one of which, in the case of a clutch is a driving member 9 and the other a pressure plate 10, or in the case of a brake, a moving member and a braking member. When said surfaces contact the friction elements 6 and 7 carried by the distorted disk sectors, a gradual increase of pressure occurs at the friction surfaces and smooth power transmission or braking results. In utilizing my invention since each disk sector is unconfined, as by a continuous annular friction ring, the sector is free to return to its original distorted position when the force of the pressure surfaces is relieved.

Referring particularly to Fig. 5, a view similar to Fig. 4 is shown wherein the disk sectors are distorted in a different manner, that is, adjacent disk sectors are offset with respect to each other. Similar to the construction of the remaining forms of my invention, sectoral friction elements 6 and 7 may be disposed upon the disk sectors in the manner hereinbefore described. The function, operation and advantages of my invention as applied to this type of friction disk are similar to those inherent in the form shown in Figs. 3 and 4.

Although various different materials may be used as constituents of sectors 6 and 7 differing from each other in frictional characteristics and durability, I preferably construct sector 6 of a friction material having a metal base, such as is described in the United States Patent Number 1,919,168, issued to George W. Perks, and sector 7 of an asbestos base, such as the usual molded or woven friction material now commonly used for clutches and brakes. The metal base material although not possessing as high a coefficient of friction as asbestos base material, is possessed of greater durability and lends strength and wear resistance to the friction disk as a whole.

I claim as my invention:

1. A friction member comprising a disk having mounted upon a face thereof a plurality of radially divided friction elements of different types, one comprising a material having characteristics of relatively low durability and relatively high coefficient of friction, and another having characteristics of relatively high durability and relatively low coefficient of friction.

2. A friction member comprising a disk having mounted upon a face thereof a plurality of radially divided sectoral friction elements of different types, one comprising a material having characteristics of relatively low durability and relatively high coefficient of friction, and another having characteristics of relatively high durability and relatively low coefficient of friction, said different elements being alternately spaced.

3. A friction member comprising a disk having mounted upon each face thereof a plurality of radially divided sectoral friction elements, the elements on both faces having different characteristics, some having characteristics of relatively low durability and relatively high coefficient of friction and other having characteristics of relatively high durability and relatively low coefficient of friction.

4. A friction member comprising a disk having mounted on both faces thereof a plurality of radially divided sectoral friction elements of different frictional characteristics, elements having one set of frictional characteristics being alternately spaced and interspersed between elements having another set of frictional characteristics, and the elements having one set of frictional characteristics positioned on one face of the disk being disposed opposite those positioned on the other face of the disk having another set of frictional characteristics.

5. A friction member comprising a disk having mounted upon a face thereof a plurality of radially divided sectoral friction elements of different types, one comprising a metal base and the other an asbestos base.

6. A friction member comprising a disk having mounted upon a face thereof a plurality of radially divided sectoral friction elements of different types, one comprising a metal base and the other an asbestos base, said metal base elements being alternately spaced with said asbestos base elements, and having a lower frictional coefficient and higher durability than said asbestos base segments.

7. A friction member comprising a disk having mounted upon both faces thereof a plurality of radially divided sectoral friction elements of different types, one type comprising metal base elements and another type comprising asbestos base elements, said metal base elements being alternately spaced with said asbestos base elements on each face of the disk.

8. A friction member comprising a disk having mounted upon both faces thereof a plurality of radially divided sectoral friction elements of different types, one type comprising metal base elements and another type comprising asbestos base elements, said metal base elements being alternately spaced with said asbestos base elements on each face of the disk, and the metal base elements on each face of the disk being disposed opposite the asbestos base elements on the opposite face of the disk.

9. A friction member comprising a disk having mounted upon a face thereof a plurality of radially divided sectoral friction elements of different types, one comprising a material having characteristics of relatively low durability and relatively high coefficient of friction, and another having characteristics of relatively high durability and relatively low coefficient of friction.

10. A friction member comprising a disk formed with a plurality of circumferentially spaced radial slots opening at the periphery thereof to form tongues, a plurality of sectoral friction elements mounted on said tongues, some of said elements having characteristics of relatively low durability and relatively high coefficient of friction, and other elements having characteristics of relatively high durability and relatively low coefficient of friction.

11. A friction member comprising a disk formed with a plurality of circumferentially spaced radial slots opening at the periphery thereof to form tongues, a plurality of sectoral friction elements mounted on said tongues, some of said elements having characteristics of relatively low durability and relatively high coefficient of friction, and other elements having characteristics of relatively high durability and relatively low coefficient of friction, said elements being arranged in alternate relation.

12. A friction member comprising a disk formed with a plurality of circumferentially spaced radial slots open at the periphery thereof to form tongues, a plurality of sectoral friction elements one mounted on each face of the respective tongues, some of said elements having characteristics of relatively low durability and relatively high coefficient of friction, and other elements having characteristics of relatively high durability and relatively low coefficient of friction.

13. A friction member comprising a disk formed with a plurality of circumferentially spaced radial slots open at the periphery thereof to form tongues, a plurality of sectoral friction elements one mounted on each face of the respective tongues, some of said elements having characteristics of relatively low durability and relatively high coefficient of friction, and other elements having characteristics of relatively high durability and relatively low coefficient of friction, and the friction elements mounted on the respective faces of said tongues being arranged in alternate relation, and each pair of friction elements of the respective tongues being of opposite characteristics.

14. A friction member comprising a disk formed with a plurality of circumferentially spaced radial slots opening at the periphery thereof to form tongues, a plurality of sectoral friction elements mounted on said tongues, some of said elements having characteristics of relatively low durability and relatively high coefficient of friction, and other elements having characteristics of relatively high durability and relatively low coefficient of friction, said elements being arranged in alternate relation, certain of said tongues of the disk together with said friction elements being disposed in axial offset relation to adjacent tongues and friction elements.

15. A friction clutch including in combination, two complementary members to be frictionally coupled together, a flattenable, oppositely offset, plate-like carrier carried by one of said complementary members, a plurality of radially divided friction elements secured to each face of said plate-like carrier, said friction elements being of substantially different friction coefficients, the friction elements being of considerable width in a direction radially across the friction elements and arranged annularly about the plate-like carrier, with friction elements on the opposite high portion of the plate-like carrier of substantially different friction coefficient from the friction elements on the opposite low portions of the plate-like carrier, and means to flatten said plate-like member and first cause the friction elements on said high portions and then cause the friction elements on said low portions, of said plate-like carrier, to frictionally engage with the other of said complementary members.

16. A friction clutch including in combination, two complementary members to be frictionally coupled together, a distortable plate-like carrier, and a plurality of radially divided friction elements of different types carried on each face of said plate-like carrier, some of said elements having characteristics of relatively low durability and relatively high coefficient of friction, and others having characteristics of relatively high durability and relatively low coefficient of friction, and means for distorting said plate-like carrier and successively engaging the elements of different characteristics with one of said complementary members.

EARL A. WALES.